United States Patent
Li et al.

(10) Patent No.: US 10,641,723 B2
(45) Date of Patent: May 5, 2020

(54) METHOD AND DEVICE FOR DETECTING DAMAGE RATE OF AN INNER COATING OF A DOWNHOLE OIL CASING

(71) Applicant: PETROCHINA COMPANY LIMITED, Beijing (CN)

(72) Inventors: Qiongwei Li, Beijing (CN); Bihai Cheng, Beijing (CN); Zewei Tang, Beijing (CN); Jianqiang Xue, Beijing (CN); Caili Fu, Beijing (CN); Huili Yang, Beijing (CN); Zhiwu He, Beijing (CN); Lihua Yang, Beijing (CN); Xinzhu Zhang, Beijing (CN); Yulai Sun, Beijing (CN)

(73) Assignee: PetroChina Company Limited, Beijing (CN)

( * ) Notice: Subject to any disclaimer, the term of this patent is extended or adjusted under 35 U.S.C. 154(b) by 128 days.

(21) Appl. No.: 15/927,779

(22) Filed: Mar. 21, 2018

(65) Prior Publication Data
US 2018/0209928 A1 Jul. 26, 2018

Related U.S. Application Data

(63) Continuation of application No. PCT/CN2016/098389, filed on Sep. 8, 2016.

(30) Foreign Application Priority Data
Sep. 25, 2015 (CN) .......................... 2015 1 0621431

(51) Int. Cl.
*G01N 27/20* (2006.01)
*E21B 47/00* (2012.01)
(Continued)

(52) U.S. Cl.
CPC ....... *G01N 27/205* (2013.01); *E21B 47/0006* (2013.01); *E21B 47/0905* (2013.01); *G01N 27/041* (2013.01); *E21B 17/1078* (2013.01)

(58) Field of Classification Search
CPC ......................... G01N 27/205; E21B 47/0006
(Continued)

(56) References Cited

U.S. PATENT DOCUMENTS 6,230,800 B1 * 5/2001 Bryant .................... E21B 33/13
166/250.01
7,673,679 B2   3/2010 Harrison et al.
(Continued)

FOREIGN PATENT DOCUMENTS

CN          10313128 A    11/2008
CN         201241694 Y     5/2009
(Continued)

OTHER PUBLICATIONS

English-language translation of Office Action, CN App. No. 201510621431.4, Petrochina Company Limited (dated Jul. 3, 2017).
(Continued)

*Primary Examiner* — Reena Aurora
(74) *Attorney, Agent, or Firm* — Foley & Lardner LLP

(57) ABSTRACT

This disclosure provides a method and device for detecting the damage rate of an inner coating of a downhole oil casing. The method includes filling the oil casing with electrolyte, obtaining the well depth-detection current on a discharge electrode in a process of moving the discharge electrode from one end of the oil casing to the other end of the oil casing, and determining a well depth-damage rate state of the inner coating of the oil casing according to the well depth-detection current. This application can realize quantitative judgment for the damage rate of an inner coating of
(Continued)

a downhole oil casing, resulting in rapid in detection speed, convenient and safe in operation, and low detection cost.

13 Claims, 4 Drawing Sheets

(51) Int. Cl.
*E21B 47/09* (2012.01)
*G01N 27/04* (2006.01)
*E21B 17/10* (2006.01)

(58) Field of Classification Search
USPC .......................................................... 324/355
See application file for complete search history.

(56) References Cited

U.S. PATENT DOCUMENTS

| | | |
|---|---|---|
| 8,353,677 B2 | 1/2013 | Thompson et al. |
| 9,423,524 B2 * | 8/2016 | Fang ..................... G01V 3/24 |
| 2006/0102345 A1 | 5/2006 | Mccarthy et al. |

FOREIGN PATENT DOCUMENTS

| | | |
|---|---|---|
| CN | 101782553 A | 7/2010 |
| CN | 102549236 A | 7/2012 |
| CN | 204060675 U | 12/2014 |
| CN | 104345077 A | 2/2015 |
| CN | 104763409 A | 7/2015 |
| CN | 105156095 A | 12/2015 |
| JP | 2000-019155 A | 1/2000 |
| WO | WO-00/79308 A1 | 12/2000 |
| WO | WO-2014/175785 A2 | 10/2014 |

OTHER PUBLICATIONS

International Search Report, PCT/CN2016/098389, Petrochina Company Limited, 3 pages (dated Dec. 14, 2016).
Supplementary Search Report, CN App. No. 201510621431.4, Petrochina Company Limited (dated Sep. 25, 2015).
Zhao Guoxian et al., Materials Protection, vol. 32, No. 4, pp. 23-24 (Apr. 30, 1999).

* cited by examiner

METHOD AND DEVICE FOR DETECTING DAMAGE RATE OF AN INNER COATING OF A DOWNHOLE OIL CASING

CROSS-REFERENCE TO RELATED APPLICATIONS

This application is a continuation of PCT Application No. PCT/CN2016/098389, filed Sep. 8, 2016, which claims the benefit of Chinese Patent Application No. 201510621431.4, entitled "Single-electrode current type detection method for inner coating of a downhole oil casing" filed on Sep. 25, 2015, both of which are incorporated herein by reference in their entireties.

TECHNICAL FIELD

This application relates to the field of anti-corrosive coating detection technology, and particularly to a method and device for detecting the damage rate of an inner coating of a downhole oil casing.

BACKGROUND

Applied an organic protective coating on the inside of a carbon steel (a material conforming to API 5CT provision) oil casing (abbreviation for "oil tubing and production casing") can effectively extend the life of the carbon-steel oil casing, such coating protection technology has been widely used in oilfields around the world. An oil casing having an inner coating is utilized more than one million meters per year. There exist a plurality of logging techniques used to solve problems, such as corrosion, damage and leakage within a body of an oil casing. Among which, the relatively well-developed logging methods widely applied in the industry mainly include types of downhole electromagnetic thickness logging, multi-armed caliper logging and temperature logging, optical television imaging, ultrasonic imaging, and the like.

Raw materials of the inner coating of the oil casing mainly include organic coatings, such as a modified epoxy phenolic, an epoxy phenolic, or the like, which are often cured on an inner surface under an ambient temperature or a high temperature to form a dense coating having a thinner thickness generally of from 0.15 mm to 0.50 mm (from 150 μm to 500 μm). Prior to the downwelling of an oil casing, it is possible to determine whether there exist quality issues of the inner coating by way of visual inspection, endoscopy, leakage point, insulation detectors, and the like, but after the downwelling of the oil casing, the oil casing also has complicated medium such as completion fluids, oil gas water and the like therein under the ground generally at hundreds to thousands of meters in depth. As the well depth increases, the well has a certain temperature and pressure therein. In this case, it is quite difficult to determine and detect whether the oil casing has an inner coating, and the length of and quality of the inner coating.

A conventional downhole electromagnetic thickness logging technology cannot produce any electromagnetic signal feedback to organic coatings.

A multi-armed caliper logging system can detect changes in the inner diameter of an oil casing. At present, the most advanced Sondex multi-armed caliper logging system achieves a radial inspection of an oil casing with the highest accuracy of only ±0.762 mm (±762 μm), which is greater than the thickness of the inner coating, thus it fails to detect the damage condition of the inner coating of the downhole oil casing, and the scales, corrosion products or wax on the inner surface of the oil casing can further affect detection accuracy.

A well temperature logging mainly determines changes in flow field temperature of the fluid produced in reservoirs of oil wells or the fluid from an upper strata invaded into the wells, and thus it is impossible to detect the presence of the inner coating of the oil casing.

It is very difficult for an optical television imaging logging system to accurately determine whether there exists an inner coating of an oil casing under the influence of the cleanliness of the surface of the oil casing, an intensity of illumination and a viewing angle of an instrument in limited space.

Although an ultrasonic imaging logging system can be used for quality evaluation of a casing and cementing, and the thickness of the wall of a carbon steel casing in the relevant publications has a radial resolution of up to 0.05 mm (50 μm), the logging and interpretation procedures are complicated with high cost, and the system has not yet been utilized in detection of an oil casing having an inner coating of oil wells.

A conventional resistivity logging method is widely used in open hole completion, of which a primary objective is to carry out a sequence determination and a sequence division of downhole rock stratum having different physical properties. The existing method cannot implement an effective detection in a carbon steel oil casing, the oil wells using a casing having an inner coating often use a casing without an inner coating in a specific section below wellhead, and use a casing having an inner coating in local sections above the bottom, thus it is quite difficult to implement an accurate detection and determination; the principle of lateral focusing method for measuring resistivity is feasible, but it presents a complicated circuit with high mechanical cost. The result of adopting a spot radiation source is a lump-type inspection, and the damage rate cannot be determined.

For detection of qualities of the pipelines having an inner coating or the inner coating of the oil casing on the ground, there exist well-developed and effective methods, such as a low pressure leak detection method, an online electric spark leak detection method, an endoscope method, and the like. For detection and analysis of the damage rate of an inner coating of a downhole oil casing, such research results or patent release have not yet been published.

SUMMARY

It is an objective of this application to solve the problem that the damage rate of an inner coating of a downhole oil casing cannot be detected and determined by way of quantitative detection in the prior art.

Accordingly, this application provides a method for detecting the damage rate of an inner coating of a downhole oil casing, comprising: filling the oil casing with electrolyte; obtaining a well depth-detection current on a discharge electrode during a process of moving the discharge electrode from one end of the oil casing to the other end of the oil casing; and determining a well depth-damage rate state of the inner coating of the oil casing according to the well depth-detection current.

This application further provides a device for detecting the damage rate of an inner coating of a downhole oil casing, comprising: a constant voltage source; a ground electrode connected with the constant voltage source; a discharge electrode connected with the constant voltage source, moving from one end of the oil casing to the other end of the oil casing; electrolyte injected into the oil casing; and a dynamic logging system connected with the discharge electrode via a logging cable for obtaining a well depth-detection current.

Advantageous effects of the present disclosure: the method and device for detecting the damage rate of an inner coating of a downhole oil casing provided by the present disclosure, in the case where there exist conductive medium in oil wells and injection water wells, can realize a quantitative judgment for the damage condition of an inner coating of a downhole oil casing by dealing with and interpreting the collected data, resulting in rapid in logging, convenient and safe in operation, low in detection cost and reliable in technology. The damage condition of an inner coating of a downhole oil casing can be on-line detected to solve the problem of quality assessment of the inner coating of the oil casing of the oil wells and injection water wells in service, which provides a technical means for the performance study about such as anti-wear impact of the coating in a downhole environment, tracking anti-corrosive effects of the inner coating, optimizing the design of the inner coating of the oil casing and developing a prediction and evaluation on a service life of the oil casing.

The invention will be further described in combination with the accompanying drawings.

BRIEF DESCRIPTION OF DRAWINGS

FIG. 1-1 is another schematic diagram illustrating the logging when the downhole instrument string is run in the oil casing.

EXPLANATION OF REFERENCE NUMERALS

Figure 1:
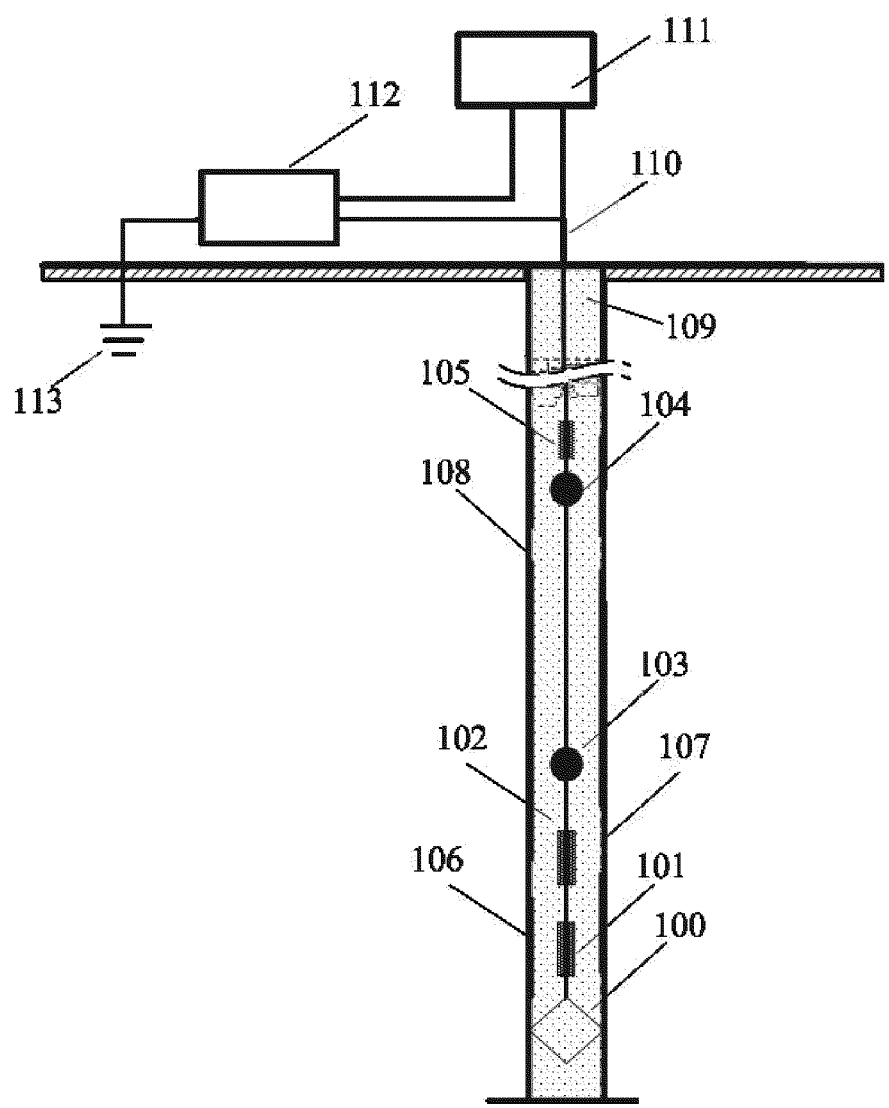
FIG. 1 is a schematic diagram illustrating the logging when a downhole instrument string is run in an oil casing.
Figure 1:
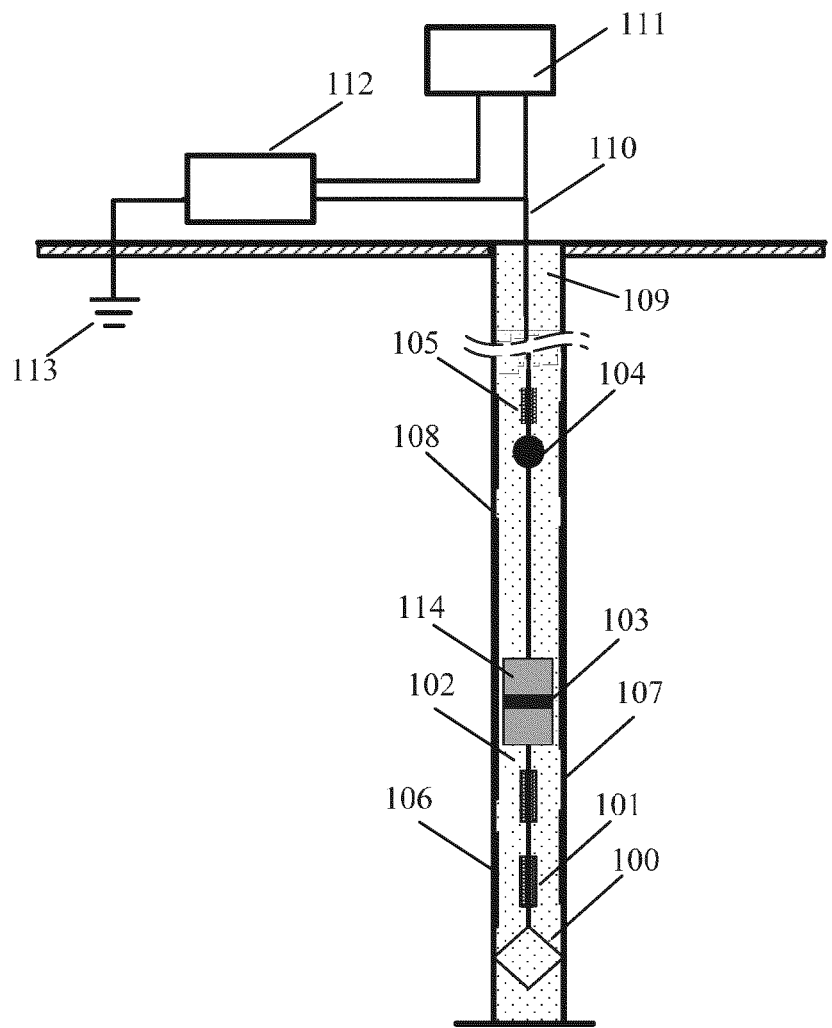

100: centralizer
101: weight bar
102: magnetic locator
103: discharge electrode
104: conductivity electrode
105: bridle
106: inner coating of an oil casing
107: oil casing
108: damages of an inner coating
109: electrolyte
110: logging cable
111: dynamic logging system
112: constant voltage source
113: ground electrode
114: insulating shield
201: galvanometer
202: resistance of the cable core of a discharge electrode
203: resistance of a ground electrode
204: resistance of electrolyte
205: resistance of an inner coating of an oil casing

DETAILED DESCRIPTION

The principle of a method for detecting the damage rate of an inner coating of a downhole oil casing provided by the present disclosure is described below in combination with FIGS. 1-3.

Basic data: the conductivity of an oil casing 107 is $7.4 \times 10^4$ s/m ($1.35 \times 10^{-4}$ Ω·m); the conductivity of the electrolyte (formation water or injection water or mixed solutions, etc.) within the oil casing 107: the conductivity is about 8 s/m (80,000 us/cm) under degree of mineralization of 50 g/l (50,000 ppm). That is, the oil casing 107 differs from the formation water in terms of the conductivity by a factor of 10,000, and the electrolyte is equivalent to an insulator, as compared with the oil casing 107, just as an organic coating is an insulator, as compared with a metal conductor. According to the equation $$R = \rho \frac{L}{S},$$

a water column of the electrolyte having a length L, a cross-sectional area S, and a resistivity $\rho_{water}$ (i.e., a derivative of the conductivity) within a wellbore of an oil well or injection water well has a resistance $R_{water}$, a current loop passing through the inner coating is established in the oil casing, and the condition of the inner coating of the oil casing is determined by analyzing the change of the current in the loop produced due to the presence of the resistance $R_{water}$ of the formation water, this is the basis of the principle of the invention.

The method specifically uses a discharge electrode 103 to supply power in a wellbore of an oil casing 107 filled with electrolyte 109, grounds the other electrode of the power supply, i.e., a ground electrode 113. The discharge electrode 103 in the wellbore is lifted up from the bottom at a constant speed in the logging process.

If the inner coating 106 of the oil casing in an area adjacent to the discharge electrode 103 remains intact, as the inner coating 106 of the oil casing is completely insulated from current, the inner coating of the oil casing in the area adjacent to the discharge electrode 103 has a maximum resistance, the current generated by the discharge electrode 103 mainly flows through a wellbore high-resistance electrolyte 109 outside the electrode area, and thus the entire loop achieves the maximum resistance; and the current flowing through the discharge electrode 103 is smallest according to Ohm's law $$I = \frac{U}{R}.$$

If the inner surface of the oil casing 107 in the area adjacent to the discharge electrode 103 has no inner coating 106 at all, the current generated by the discharge electrode 103 flows directly into the oil casing 107 through the electrolyte 109 in the area adjacent to the discharge electrode 103 (since the conductivity of the oil casing 107 is much greater than that of the electrolyte, and the electrode is adjacent to the inner coating of the oil casing 107 with a gap <0.02 m), there is no current flowing in the electrolyte outside the electrode area, the inner coating of the oil casing at the discharge electrode 103 has a minimal resistance and also the loop resistance is smallest, and meanwhile the current increases to maximum.

If there exist defects, such as damages, decrease in resistivity or the like of the inner coating 106 of the oil casing in the area adjacent to the discharge electrode 103, being equivalent to that different extents of metal exposed areas are present in the coating surface of the inner surface of the oil casing 107, the current passes into the oil casing 107 through the defects, the loop resistance lies between a maximum value and a minimum value; as the power supply has a constant voltage, the current flowing through the discharge electrode 103 also lies between a maximum value and a minimum value. The greater the damage 108 of the inner coating or the more damage points, the smaller the loop resistance, which macroscopically reflects that the defects of the inner coating are in negative correlation with the resistance, and in positive correlation with the loop current.

The damage rate states (i.e., a well depth-inner coating damage rate curve) corresponding to different well-depth positions in the longitudinal direction of the inner coating of the oil casing in the downhole wellbore can be measured by moving the discharge electrode 103 within the oil casing.

Owing to the conductivity (i.e., a reciprocal of the resistivity) of the electrolyte in the downhole wellbore and the size of the discharge electrode affecting the function relationship between the damage rate of the coating and the current, a discharge electrode in the same size is employed in the on-site detection and calibration experiments, and meanwhile, calibration experiments are performed on-site using the electrolyte having the same conductivity to obtain a function relationship between the damage rate of the coating and the current.

Figure 3:
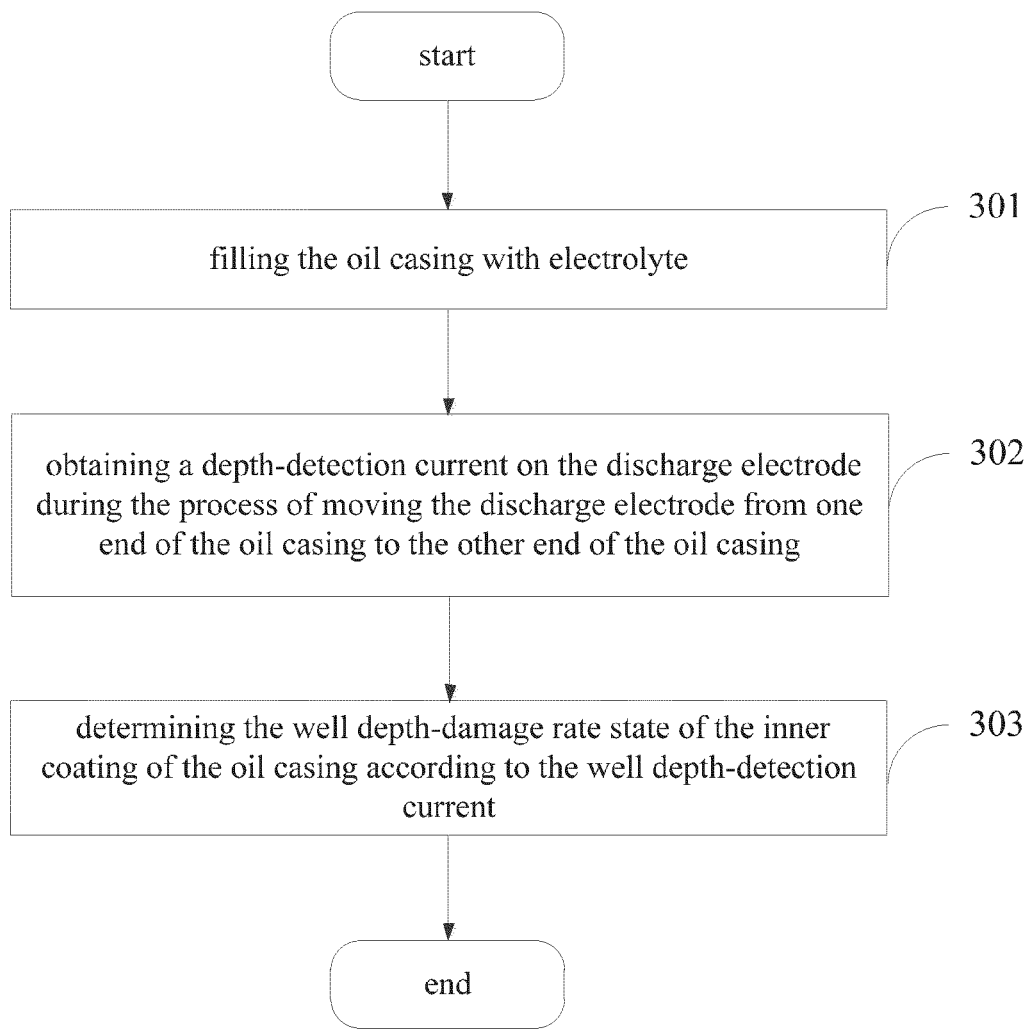
FIG. 3 is a primary flow chart implementing the method for detecting the inner coating damage rate of a downhole oil casing.

This application provides a method for detecting the damage rate of an inner coating of a downhole oil casing, in combination with the primary flow chart of FIG. 3, which comprises:

Step 301: filling the oil casing with electrolyte;

Step 302: obtaining a depth-detection current on the discharge electrode during the process of moving the discharge electrode from one end of the oil casing to the other end of the oil casing; and Step 303: determining the well depth-damage rate state of the inner coating of the oil casing according to the well depth-detection current.

In order to more clearly illustrate the technical solutions of the present application, the following is described with a detailed embodiment, the specific detection steps are as follows:

Step 1: connecting detection devices. Preparing a downhole instrument string including a logging cable 110, one end of which is electrically connected with a magnetic locator 102, a discharge electrode 103 and a bridle 105 in turn from the bottom to the top, and the bottom of the logging cable 110 is connected with a centralizer 100; and the other end of which is electrically connected with a constant voltage source 112 electrically connected to a dynamic logging system 111 that is electrically connected with the logging cable 110, the constant voltage source 112 is electrically connected with the ground electrode 113, and a ground position of the ground electrode 113 is spaced from the wellhead by more than 20 m.

Step 2: filling the oil casing with electrolyte having a conductivity of less than 2,000 μs/cm, and running the downhole instrument string in the oil casing 107 to be detected, first running into the bottom, and then lifting the logging cable 110 up at a constant speed, and meanwhile, the dynamic logging system 111 collects the current of a on-site loop consisting of the constant voltage source 112, the discharge electrode 103, the damages of the inner coating 108, the electrolyte 109 as well as the ground electrode 113, and the well depth and the conductivity, while measuring the current (i.e., the maximum current) under a state of no coating within the oil casing to obtain well depth-onsite loop current data.

Step 3: formulating electrolyte for experiments, so that its conductivity is equal to that of the electrolyte in the wellbore measured onsite (being consistent with the nature of the electrolyte in all sections of the wellbore, and being considered as a constant value).

Step 4: preparing a sample pipe with a known inner coating damage rate used for experiments, wherein the sample pipe has the same size as that of the oil casing to be detected, filling the sample pipe with the electrolyte used for experiments formulated in the step 3, running the downhole instrument string in the sample pipe, wherein the centralizer 100, the magnetic locator 102, the discharge electrode 103 and the bridle 105 of the downhole instrument string are located in the sample pipe (if the sample pipe has a limited length, it can be simplified, i.e., only the discharge electrode 103 is placed and centered into it), and the constant-pressure source 112 and the dynamic logging system 111 are both located on the ground; connecting the detection devices as a loop, which is the same as the step 1, except that a variable resistor needs to be additionally connected in series in the loop in this step, and the variable resistor is adjusted, so that the current of the sample pipe without coating is equal to that of the oil casing without coating to be detected (this step ensures that circuit parameters of the onsite detection is consistent with those of the calibration experiment), the logging cable 110 is lifted up at a constant speed, and meanwhile, the dynamic logging system 111 collects the current of an experimental loop consisting of the constant voltage source 112, the discharge electrode 103, the damages of the inner coating 108, the electrolyte 109 as well as the ground electrode 113.

Step 5: changing the known damage rate of the inner coating of the sample pipe; the dynamic logging system 111 collects the current of the experimental loop consisting of the constant voltage source 112, the discharge electrode 103, the damages of the inner coating 108, the electrolyte 109 as well as the ground electrode 113, and this step is repeated to obtain a data set where a different known damage rate corresponds to the current of a different experimental loop.

Step 6: obtaining a function relationship of damage rate-current of the inner coating under the same electrolyte conductivity according to the known damage rate in step 5 and the data set of the currents of the experimental loop.

Step 7: obtaining a relationship curve of the well depth-inner coating damage rate of the oil casing 107 by conversion, according to the well depth-onsite loop current data detected on-site in step 2 and the function relationship of the damage rate-current of the inner coating obtained in step 6.

As shown in FIGS. 1 and 1-1, the downhole instrument string comprises: a centralizer 100, a magnetic locator 102, a discharge electrode 103, an insulating shield 114, a bridle 105 and a logging cable 110 in turn from the bottom to the top, where the logging cable 110 uses a standard heptcable (Standard seven-core cable), and the centralizer 100 has the function of centralizing the downhole instrument string, the discharge electrode 103 applies a positive or negative voltage to the electrolyte in the oil casing 107, the bridle 105 plays roles in conversion, logging and security, and the insulating shield 114 has the function of fixing the discharge electrode 103, shielding the loop current and diverting the electrolyte.

A ground system comprises: a constant voltage source 112, a ground electrode 113 and a dynamic logging system 111, where the constant voltage source 112 provides a power supply having a constant voltage, and the ground electrode 113 is grounded, so that a circuit loop is completed for the discharge electrode 103, and the dynamic logging system 111 functions to collect and record the loop current of the circuits, provide the power of connecting cables, correct the well depth, convert signals and the like. Meanwhile, the dynamic logging system 111 obtains data about relationship of the well depth-inner coating damage rate of the onsite oil casing according to the well depth-field loop current data detected onsite and the function relationship of the damage rate-current of the inner coating obtained by experiments, and draws a curve of the well depth-inner coating damage rate relationship.

Figure 2:
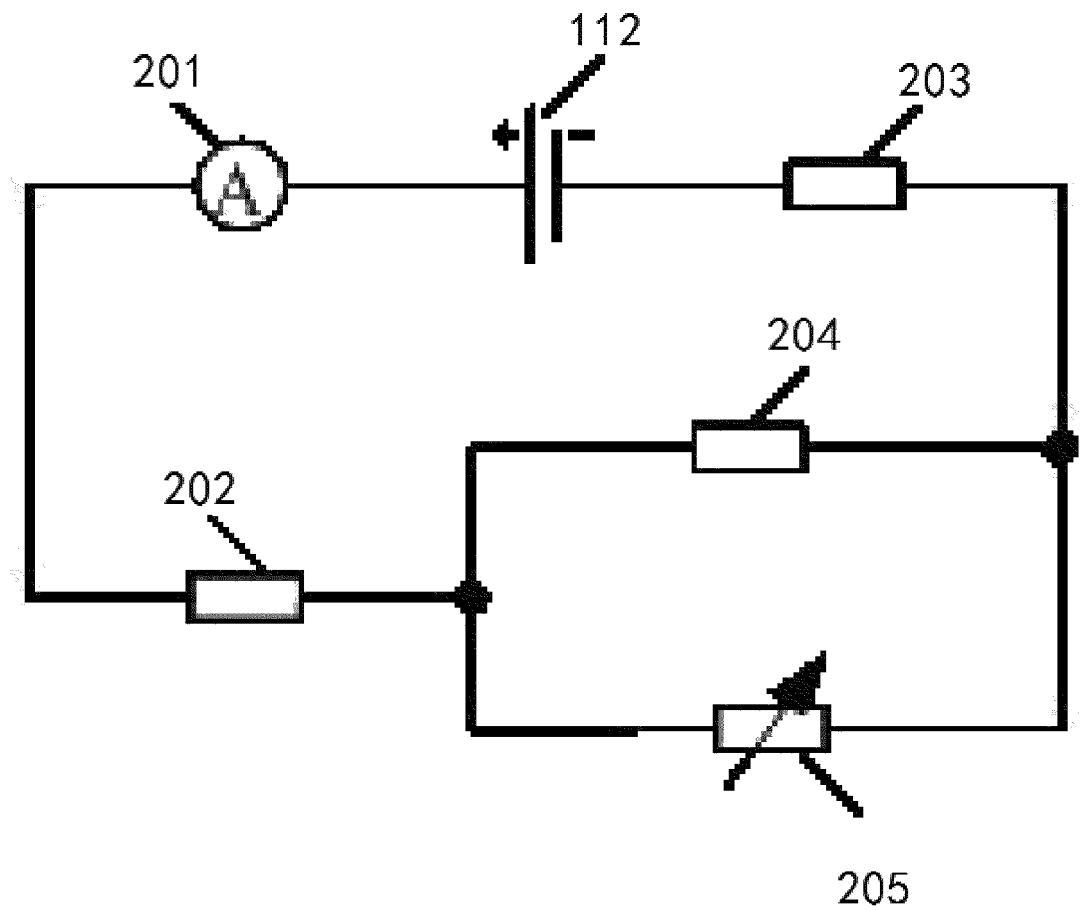
FIG. 2 is a circuit schematic diagram illustrating a method for detecting the damage rate of an inner coating of a downhole oil casing.

As shown in FIG. 2, the constant voltage source 112 provides the system with a constant voltage, resistance values $R_{203}$, $R_{202}$, $R_{204}$ of a resistance 203 of the ground electrode, a cable core resistance 202 of the discharge electrode and a resistance 204 of the electrolyte are approximately constant values, and a galvanometer 201 corresponds to an acquisition instrument or an ammeter, and a resistance 205 of the inner coating of the oil casing is a resistance characterizing when the damage rate of the inner coating of the oil casing in the area adjacent to the discharge electrode 103 is changed.

The principle in FIG. 2 that the loop current reflects the damage rate of the inner coating is as follows:

If the inner coating 106 of the oil casing in the area adjacent to the discharge electrode 103 is completely damaged, the damage rate is 100%, a resistance value $R_{inner\ coating}$ (i.e., $R_{205}$ in FIG. 2) of the resistance 205 of the inner coating of the oil casing is zero ohm, the current of the discharge electrode 103 returns to the oil casing 107 directly through the electrolyte in the area adjacent to the discharge electrode 103 without through the electrolyte in other areas within the oil casing 107, and the galvanometer 201 measures to obtain the maximum current $I_{max}$ (although the current may vary with the circuit parameters, these circuit parameters are unified in the onsite detection and calibration experiments).

If the inner coating 106 of the oil casing in the area adjacent to the discharge electrode 103 remains intact, the damage rate is zero, a resistance value $R_{inner\ coating}$ of the resistance 205 of the inner coating of the oil casing is extremely large (e.g., megohm or higher), the current of the discharge electrode 103 flows back to the constant voltage source 112 through the electrolyte 109 in the wellbore and the oil casing 107, and the galvanometer 201 measures to obtain the minimum value $I_{min}$ of the current.

If the inner coating 106 of the oil casing in the area adjacent to the discharge electrode 103 has some damage rate, that is K, a resistance value $R_{inner\ coating}$ of the resistance 205 of the inner coating of the oil casing reflects a magnitude of the damage rate K of the coating ($R_{inner\ coating} \propto K$, which are almost in proportion to each other), the current of the discharge electrode 103 is applied to the electrolyte 109 in the wellbore and the damages of the coating 108 respectively; a total resistance of the circuit depends primarily on the resistance value $R_{inner\ coating}$ of the resistance 205 of the inner coating of the oil casing in the area adjacent to the discharge electrode 103 according to a calculation rule of series-parallel resistances of a circuit, the total current I varies only with the damage rate K when the voltage U of the constant voltage source is constant, thus the total current I reflects the damage rate K.

Example 1

Some well is detected using the method of detecting the damage rate of an inner coating of a downhole oil casing provided in this application.

The material of some well casing is carbon steel with an outer diameter of 139.7 mm and a wall thickness of 7.72 mm, the recorded information of the casing shows that a section without inner coating of the casing ranges from the wellhead to 911.7 m, and a section with inner coating of the casing ranges from 911.7 m to the bottom, the inner coating is an epoxy-phenolic high-temperature sintering curing coating with a short casing positioned at 1,435 m to 1,438.5 m; prior to the detection, the inner coating of the well casting has served for one year and eight months.

Using the device according to this application, the constant voltage source has a voltage of U=30V, and the method of collecting a loop current is a method of sampling resistance with the resistance value of 20Ω.

Preparation for onsite detection: reviewing the well history of the well to be detected, developing a logging plan, a HSE (health, safety, environmental protection) plan, workover rigs, power and logging vehicles and instrument and persons homing. Pulling out the oil tubing and the pump, detecting the casing with a gauge cutter, cleaning up the well thoroughly with injected water having a conductivity smaller than 1,000 μs/cm, replacing the initial wellbore fluid, so as to ensure that the wellbore is clean and the state of the electrolyte in all sections of the wellbore is constant (i.e., a constant conductivity). Detecting a fluid level, enough injection water should be prepared and filled up to the wellhead if not enough.

Onsite detection: connecting the downhole instrument string, paying attention to the sealing between sections and buckling on the connection, preventing entry of the fluid, buckling appropriately prevents the downhole instrument string from falling into the well. The discharge electrode is required to be insulated from the casing. The grounding system is debugged until normal operations, parameter setting is completed and the well depth is calibrated. First, the instrument string is run in the bottom of the well and then a measurement is performed while lifting up the instrument string with a speed of less than 1,000 m/hr. The speed is slowed down at the critical sections and the measurement is repeated if necessary, the logging system collects the well depth, loop current and conductivity data, and draws the well depth-detection current curve; it can be known from the measurement that the currents in the section without coating in an upper part of the wellbore and in a perforated section in the bottom of the well both are 100 mA (such current serves as the maximum current of unifying the circuit parameters during the calibration experiments).

Calibration experiments: producing sample pipes with an inner coating of different known damage rates (a ratio of a metal exposed area to an area of the whole coating), the sample pipes have the same size as the onsite casing, the specific level of the defect needs to be determined according to practical requirements, which can be that the inner coatings of the sample pipes remains intact, or has damage rates of <1%, ~1-5%, ~5-15%, ~15-30%, ~30%-70%, >70% and 100% (i.e., the sample pipes without inner coating) respectively, and then vertically connecting the sample pipes with inner coating in an experimental well, the wellbore of the experimental well is filled up with the electrolytic brine prepared based on the onsite conductivity, connecting the detection devices, adjusting the variable resistors connected in series so that the current is 100 mA when there is no coating, and subsequently, measuring and obtaining experimental currents using sample pipes with inner coating of different known damage rates.

Results processing output: according to the known damage rate and experimental current data set obtained from the calibration experiments, fitting a known damage rate-experimental current function relationship under the onsite conductivity, and according to the known damage rate-experimental current function relationship, converting the well depth-detection current data collected onsite from some well into well depth-inner coating damage rate data and drawing a well depth-inner coating damage rate curve. The data results are given in Table 1.

such relationship, converting the well depth-current relationship under any conductivity detected onsite into well depth-inner coating damage rate relationship and drawing a curve.

The single electrode current detection method for an inner coating of a downhole oil casing provided by the present disclosure, in the case where there exist conductive medium in oil wells and injection water wells, can realize a quanti-

TABLE 1

| No. | Well depth (m) | Current (mA) | Damage rate | Description of an inner coating of an oil casing | Quality levels of the coating | Remarks |
|---|---|---|---|---|---|---|
| 1 | wellhead ~912 m | 100 | 100% | without inner coating | / | the casing with an inner coating is not run in |
| 2 | ~912-1500 | 10-70 | ~0-$K_1$ | sections with an inner coating | good | the casing with an inner coating is run in |
| 3 | ~920-921, ~930-931, ~1425-1426, etc. | 40-70 | ~$K_2$-$K_1$ | the quality of the coating is poor | poor | casing coupling position has no inner coating or poor construction |
| 4 | ~921-930, ~931-940, ~1415-1426 | 10-40 | ~0-$K_2$ | the quality of the coating is excellent | excellent | body sections of the casing |
| 5 | ~1434-1439 | 100 | 100% | without inner coating | / | such section is the short casing position of the well where no coating is performed |
| 6 | ~1447-1448 | 100 | 100% | the quality of the coating is poor | poor | casing coupling |

It is found that the measurement results are consistent with the recorded information of the casing, the quality condition of a downhole anti-corrosive well with an inner coating in service is intuitively reflected by logging, and data support can be provided for applying evaluation technology of the inner coating.

Example 2

In steps of the method for detecting the damage rate of an inner coating of a downhole oil casing, a weight bar 101 is connected between a centralizer 100 and a magnetic locator 102, the centralizer 100 and the weight bar 101 can function to centralize the downhole instruments. A conductivity electrode 104 for detecting a conductivity of the electrolyte is provided between the discharge electrode 103 and the bridle 105 as described in the step 1. The speed of lifting the logging cable 110 up at a constant speed in the step 2 is less than 1,000 m/hr. The dynamic logging system 111 adopts a SKD3000 computerized logging surface system.

In steps of the method for detecting the damage rate of an inner coating of a downhole oil casing, it is also possible to use the following calibration experimental method: preparing electrolyte of different conductivities in the step 3, obtaining different currents at different conductivities of the electrolyte and different inner coating damage rates in experiments in the step 4, so as to obtain a data set of three associated parameters: conductivity, inner coating damage rate and current, deducing and obtaining an inner coating damage rate-current relationship under any conductivity using a well-known numerical calculation method, based on tative judgment for an inner coating of a downhole oil casing by dealing with and interpreting the collected data, resulting in rapid in logging, convenient and safe in operation, and low in detection cost. Solving the problem of quality assessment of the inner coating of the oil casing of the oil wells and injection water wells in service provides a technical means for tracking anti-corrosive effects of the inner coating, optimizing a design of the inner coating of the oil casing and performing prediction and evaluation of a service life of the oil casing.

The foregoing is merely intent to be illustrative of the present invention and is not to be construed as limiting the scope of the present invention, and any design identical or similar to the present invention falls within the scope of the present invention. The components and structures not described in detail in embodiments are members well known in the art and common structures or conventional means, and are not described one by one here.

The invention claimed is:
1. A method for detecting the damage rate of an inner coating of a downhole oil casing, the method comprising:
    filling an oil casing with electrolyte;
    detecting a loop current of a discharge electrode and a well depth of the discharge electrode in a process of moving the discharge electrode from one end of the oil casing to the other end of the oil casing, and obtaining a well depth-detection current data based on the loop current and the well depth;
    obtaining a function relationship of a known damage rate-experimental current by experimental method; and determining a well depth-damage rate state of the inner coating of the oil casing according to the well depth-detection current data and the function relationship of the known damage rate-experimental current.

2. The method according to claim 1, wherein a calculation formula of the well depth-detection current I is as follows:

$$I = \frac{U}{R_{cable} + R_{grounding} + \frac{R_{inner\ coating} \times R_{electrolyte}}{R_{inner\ coating} + R_{electrolyte}}}$$

where U is a voltage of a constant voltage source; I is a well depth-detection current on the discharge electrode; $R_{cable}$ is a resistance of a logging cable; $R_{grounding}$ is a grounding resistance; $R_{inner\ coating}$ is a resistance of an inner coating in an area adjacent to the discharge electrode; and $R_{electrolyte}$ is a resistance characterizing the current flowing back to the oil casing from outside of the area adjacent to the discharge electrode through the electrolyte.

3. The method according to claim 1, wherein the discharge electrode has a moving speed of less than 1,000 m/h.

4. The method according to claim 1, wherein the electrolyte is surface water or mixed water of the surface water and formation water, and the conductivity of the electrolyte is less than 2,000 μs/cm.

5. The method according to claim 1, wherein the discharge electrode is an inert and inactive metal ring of an outer guide wire, the two end surfaces and an inner ring surface of the inert and inactive metal ring are coated with an insulating coating, and a distance from an outer ring surface of the inert and inactive metal ring to an inner surface of the oil casing is less than 0.02 m.

6. The method according to claim 1, wherein the material of the oil casing is carbon steel and the material of the inner coating of the oil casing is organic insulating coating.

7. A device for detecting the damage rate of an inner coating of a downhole oil casing comprising:
   a constant voltage source;
   a ground electrode connected with the constant voltage source;
   a magnetic locator and a discharge electrode connected with the constant voltage source through a logging cable;
   electrolyte injected into the oil casing; and
   a dynamic logging system connected with the magnetic locator and the discharge electrode via the logging cable for controlling the movement of the logging cable, so as to drive the magnetic positioner and the discharge electrode to move from one end of the oil casing to the other end of the oil casing, obtaining a well depth of the discharge electrode from the magnetic positioner and a loop current from the logging cable, and obtaining the well depth-detection current data base on the loop current and the well depth.

8. The device according to claim 7, further comprising a centralizer connected with the discharge electrode via the logging cable for maintaining the discharge electrode always at the center of the oil casing.

9. The device according to claim 7, further comprising an insulating shield disposed on the discharge electrode for fixing the discharge electrode, shielding the loop current and diverting the electrolyte.

10. The device according to claim 7, further comprising a weight bar disposed between the discharge electrode and the centralizer for enabling the logging cable to be in a straighten state, so that the centralizer move smoothly within the oil casing.

11. The device according to claim 7, further comprising a bridle disposed between the discharge electrode and the dynamic logging system for converting logging connectors and detecting the operation safety.

12. The device according to claim 7, further comprising a conductivity electrode disposed between the discharge electrode and the bridle for detecting the conductivity of the electrolyte, so as to obtain conductivity parameters required when preparing the experimental electrolyte in calibration experiments.

13. The device according to claim 7, wherein when the inner coating of the oil casing is intact, a current loop is formed between the discharge electrode and the ground electrode through the electrolyte and the oil casing; and
   when the inner coating of the oil casing in the area adjacent to the discharge electrode is damaged, a current loop is formed between the discharge electrode and the ground electrode through the electrolyte, the damages of the inner coating of the oil casing and the oil casing.

* * * * *